United States Patent [19]

Snyder

[11] 4,442,348

[45] Apr. 10, 1984

[54] SOLAR TRACKING APPARATUS FOR A GIMBALED BODY

[76] Inventor: Wesley L. Snyder, 1103 Forest Home Dr., Houston, Tex. 77094

[21] Appl. No.: 292,607

[22] Filed: Aug. 13, 1981

Related U.S. Application Data

[63] Continuation of Ser. No. 73,128, Sep. 6, 1979, abandoned, which is a continuation of Ser. No. 880,882, Mar. 16, 1978, Pat. No. 4,276,122.

[51] Int. Cl.³ .............................................. G01J 1/24
[52] U.S. Cl. .................................. 250/203 R; 126/425
[58] Field of Search ................ 250/203 R; 126/424, 126/425; 356/141, 152

[56] References Cited

U.S. PATENT DOCUMENTS

| | | | |
|---|---|---|---|
| 2,455,834 | 12/1948 | Ushakoff . | |
| 3,351,536 | 11/1967 | Fox . | |
| 3,357,897 | 12/1967 | Salzer . | |
| 3,390,056 | 6/1968 | Ingram . | |
| 3,421,004 | 1/1969 | Cashion | 250/203 R |
| 3,679,906 | 7/1972 | Myers . | |
| 3,980,526 | 9/1976 | Kirshmann . | |
| 3,986,021 | 10/1976 | Hitchcock | 250/203 R |
| 3,996,460 | 12/1976 | Smith | 250/203 R |
| 3,996,917 | 12/1976 | Trihey | 126/424 |
| 4,010,080 | 1/1977 | Tsay et al. . | |
| 4,013,885 | 3/1977 | Blitz | 250/203 R |
| 4,041,307 | 8/1977 | Napoli et al. | 250/203 R |
| 4,205,659 | 6/1980 | Beam | 250/203 R X |
| 4,223,174 | 9/1980 | Moeller | 250/203 R X |

Primary Examiner—David C. Nelms
Assistant Examiner—Edward P. Westin
Attorney, Agent, or Firm—Arnold, White & Durkee

[57] ABSTRACT

A solar tracking device is disclosed for detecting incident solar radiation and providing a means for orienting a gimbaled body relative to the solar radiation. The tracking apparatus is insensitive to movements of the gimbaled body caused by environmental factors, for example wave motion when the body is located in water. The tracker comprises a plurality of light receiving sensors, with each sensor independent and capable of individual adjustment; a means for moving the gimbaled body about a perpendicular axis relative to the position of the sun; and sensitizing means including coarse and fine adjustment means needed to control the amount of radiation to activate sensors, thus inhibiting the movement of the gimbaled body in unfavorable environmental conditions.

17 Claims, 18 Drawing Figures

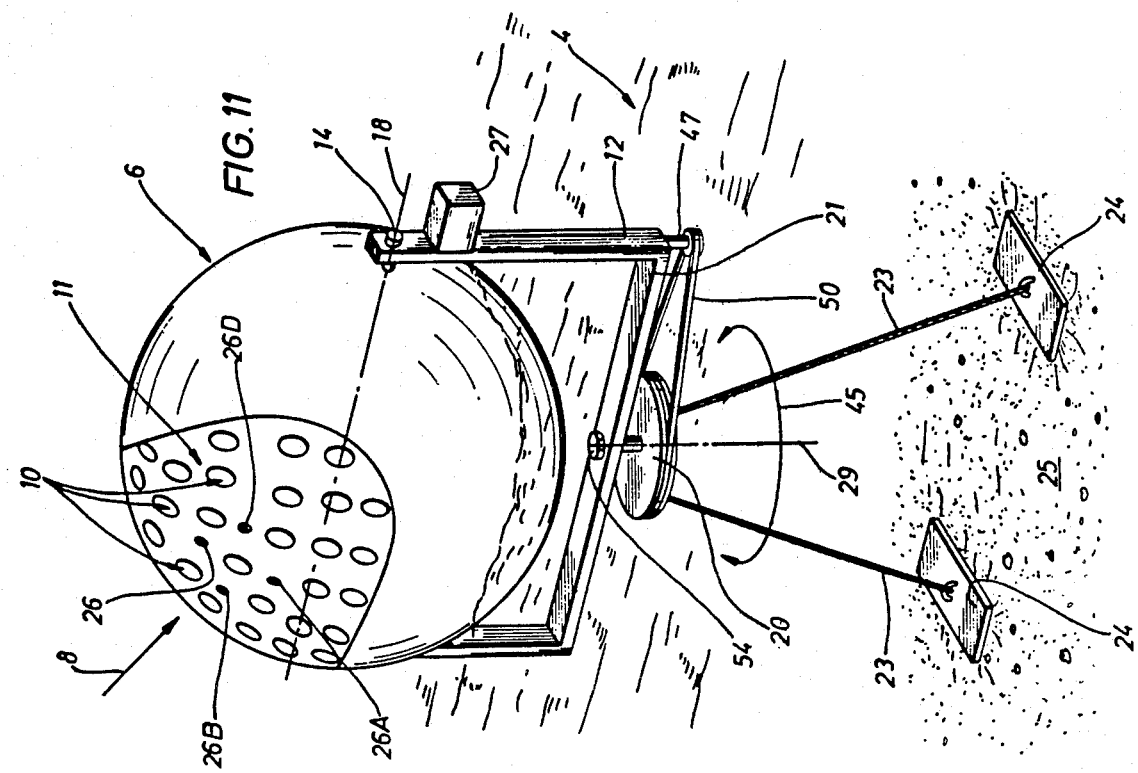
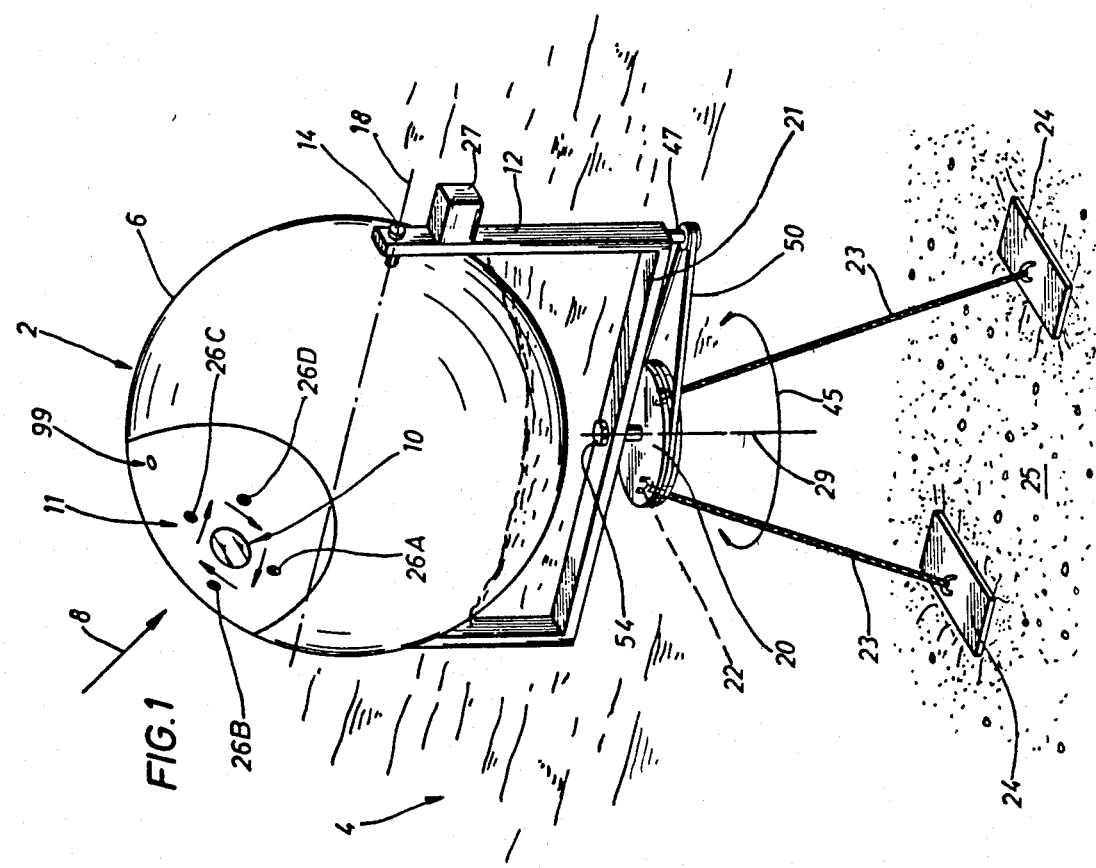

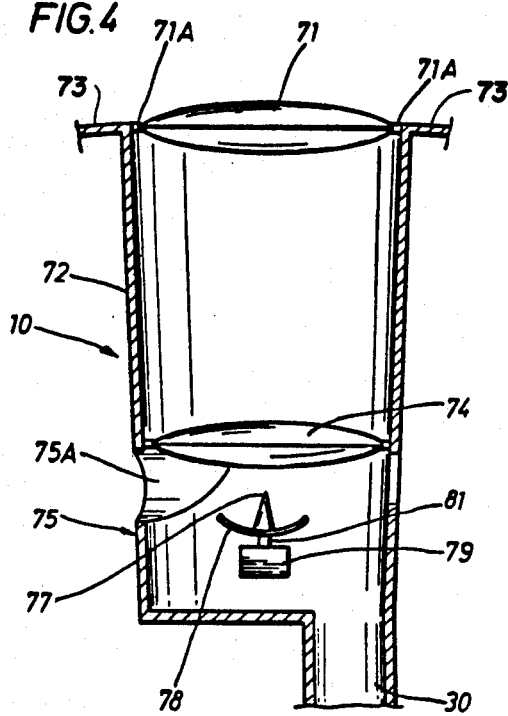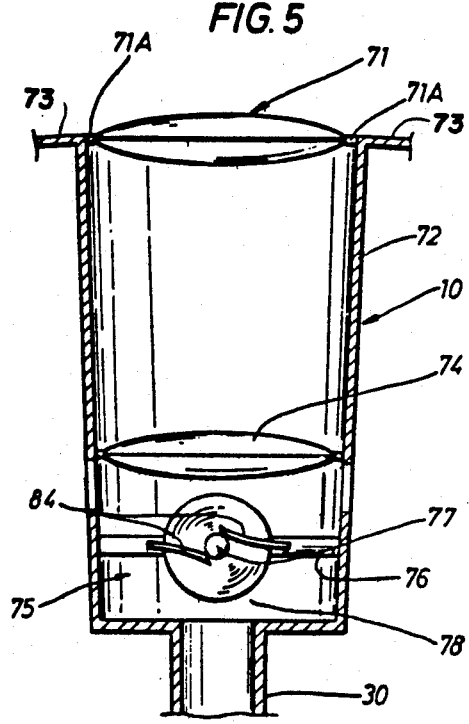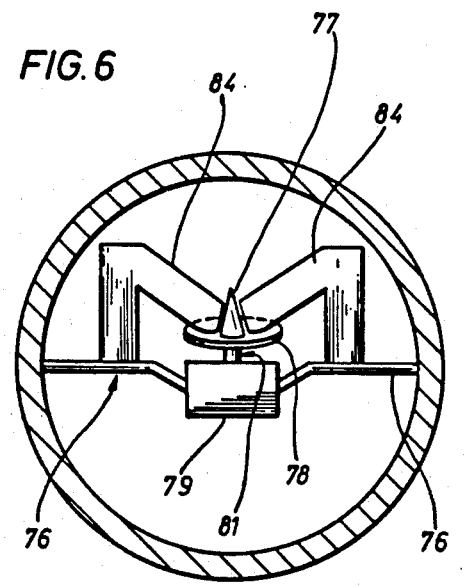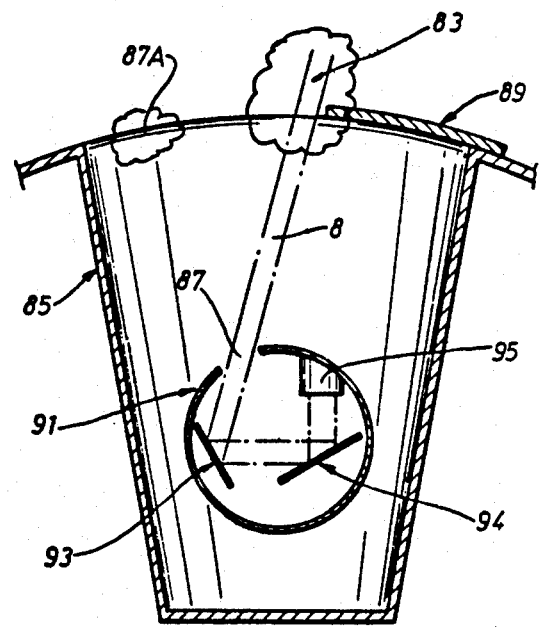

SOLAR TRACKING APPARATUS FOR A GIMBALED BODY

This application is a continuation of the divisional application Ser. No. 073,128, filed Sept. 6, 1979, now abandoned, which is a continuation application of U.S. application Ser. No. 880,882, filed Mar. 16, 1978, now U.S. Pat. No. 4,276,122 issued June 30, 1981.

BACKGROUND OF THE INVENTION

The invention relates to a novel apparatus for desalinating saltwater in an ocean environment by utilizing solar energy. With an increasing amount of offshore work, particularly in the petroleum industry, there is a growing need for a safe, economical, and efficient way of producing large quantities of fresh water from the abundance of available saltwater. The apparatus disclosed will not only produce an abundant amount of fresh water from saltwater, but it will operate entirely off solar radiation.

Presently, the offshore industry must either transport the fresh water from onshore via supply boats or pipelines or chemically treat saltwater at the offshore site. Either method is very expensive, particularly the latter which requires an enormously large amount of chemicals for obtaining the required quantity of fresh water on an industrial scale. While the existing practices exhibit some utility, the industry has always felt there was a need for significant advancement.

Distillation of saltwater by solar heat is well documented in the prior art. However, the disclosures relating to offshore distillation have catered to emergency units utilized in distress situations. Fox, U.S. Pat. No. 3,351,536, Ushakoff, U.S. Pat. No. 2,455,834, and Ingram, U.S. Pat. No. 3,390,056, disclose inflatable or expandable spherical or spheroid shaped devices which are easily assembled by one man in a raft or similar craft. The basic operating principle of all three inventions is the same. Saltwater is evaporated by solar heat and allowed to condense on the inner surface of the unit. The operation will occur regardless of the sun's orientation due to the device's spherical striking surface. However, the systems are hampered by cloudy conditions.

A particular problem associated with the emergency units is the inability of such devices to produce large enough quantities on an industrial scale. Saltwater is introduced into the evaporating chamber by capillary action (Ingram) or pressure differential (Ushakoff). In Fox the saltwater is pumped directly into the evaporating chamber and a vacuum is then placed on the chamber. Due to the vacuum, the evaporating temperature of the saltwater at the surface of the water is lowered. However, the process is still hampered by a slow rate of evaporation/condensation. Enlarging the overall systems do not satisfy the demand.

More particularly, the invention concerns a desalinating solar heating apparatus which will automatically search out the sun at all times and orient itself with respect to the incident radiation from the sun. It will automatically adjust itself about mutually perpendicular gimbal axes. Therefore, the apparaus will follow the path of the sun about an azimuth and elevation angle. Several types of solar tracking systems are disclosed in the art. Trihey, U.S. Pat. No. 3,996,917, discusses several embodiments of a tracking system wherein all four photoelectric cells are mounted on a common base; yet, each sensor is shielded from the other by reflector vanes or geometric placement. Alternate forms of tracking systems are disclosed in Napoli et al. U.S. Pat. No. 4,041,307. Cashion, U.S. Pat. No. 3,421,004, and Smith U.S. Pat. No. 3,996,460. The systems operate off a photoelectric cell activated by the changing position of the sun. Unfortunately, the light striking the region of the tracking system is not defined by a sharp, definite boundary. Therefore, the sensitivity of the systems has been a constant problem. Defining at what point the photoelectric cell responds has been hampered by the inability to isolate each one within its own sheltered environment and, yet, assure consistent results among all the photocells and between consecutive tests. Recognizing this problem, Napoli, reveals the use of a lens to define a narrow region of uniform light. However, because of the limited angular movement the light source may move before bypassing this region of fine sensitivity, Napoli has included an additional set of four photoelectric cells sheltered by an overhanging flange to initially orientate the device. Essentially, the four perimeter photoelectric cells that are sheltered by the flange act as a rough tuner in orientating the device while the four inner photoelectric cells located beneath the lens act as a fine tuner. Smith discusses an adjustable shadow line system used in the general orientation of a solar device which comprises an open shadow box with movable window edges arranged around it. The adjustment of the window edges moves the shadow which falls upon the photoelectric cells thereby affecting its sensitivity. This being the only adjustment means available, there is no rough/fine distinction in controlling the sensitivity of the cells as noted in Napoli.

The problems enumerated in the foregoing are not intended to be exhaustive but rather are among many which tend to impair the effectiveness of the prior art on an industrial scale. Other noteworthy problems may also exist; however, those presented above should be sufficient to demonstrate that the present methods available to industrial users of fresh water in a saltwater environment have not been altogether satisfactory.

SUMMARY OF THE INVENTION

The invention is a solar distillation apparatus comprising an enclosed shell which floats in an upright position, providing a chamber for the vaporization of saltwater or contaminated fresh water and condensation of potable fresh water; a light focusing system, which is located preferably in one quadrant of the shell's surface and focuses the incident radiation on one or more heating elements: a control system, which detects the direction of the incident radiation and automatically orients the light focusing system such that the light focusing system focuses the radiation at all times: a saltwater injection system, which delivers saltwater to the heating element at a predetermined rate for heat transfer from the element to the water resulting in its vaporization: and, a condensation surface for liquifying the water vapor. The inner surface of the shell serves as the condensation area.

Although the description found herein refers primarily to the distillation of saltwater the invention performs equally well on the distillation of contaminated fresh water.

Initially, saltwater is introduced into the shell by an injection system. This injection system delivers the saltwater at a predetermined rate to a heating element which is located behind the light focusing system. The system includes one or more lenses which focus the incident radiation on the heating element. When the heating element, which is generally made of carbon, reaches a predetermined temperature, saltwater is ejected into a bowl which surrounds the heating element, used for heat transfer, thereby resulting in the vaporization of the water. The resulting water vapor condenses on the cooler inner surface of the shell as fresh water. Eventually, the condensation runs to the bottom of the shell where it is collected and removed. The residual matter, which remains after the evaporation of the saltwater on the contaminated fresh water, remains in the gimbaled bowl. The residual matter is periodically scraped off the bowl into an overflow cup and ejected from the shell by means of a passage extending from the overflow cup to the surface of the shell.

In the preferred embodiment of the invention the light focusing system comprises a pair of lenses mounted within a lens housing and located within one quadrant of the shell's surface. A heating element is located a predetermined distance behind the light focusing system at approximately its focal point. The concentration of sunlight through the focusing system elevates the temperature of the heating element and provides a source for the heat transfer to the ejected saltwater. Preferably, the shell is spherical in shape. However, the structure may be of various shapes. Spherical is an optimum shape if floated. If the shell is secured atop a fixed platform or similar base, the shell may be any shape such as cylindrical, rectangular, or cubic.

To assure maximum efficiency from the operation during daylight hours, the lens focusing system should always face the sun. Due to the sun's changing position, however, the orientation of the light focusing system must vary. To track the sun four sensors are equally spaced around the light focusing system. The shell is gimbaled about a first and second axes which are mutually perpendicular. Working in pairs, the sensors activate a first or second motor which reorientates the shell about a first or second axis, respectively. Each sensor comprises a photoelectric cell sensitive to the incident radiation of the sun. Each photoelectric cell within the sensor operates to reorientate the shell in one direction about one of the gimbal axes. In this manner, the four photoelectric cells accommodate movement of the shell in four possible rotary directions. At the end of the day, a return system reorientates the shell towards its original easterly direction for the next day's sunrise. The power supply for all the electrical systems used in the desalinating operation are batteries rechargeable by solar-cells.

In an alternate embodiment of the invention, a plurality of light focusing systems, each comprising one or more lens mounted within a lens housing, are located adjacent one another on one-third the surface area of the shell. For purposes of discussion, however, the description will be directed to the plurality of light focusing systems as being within one quadrant of the shell. Such is not a limitation, however, as the light focusing systems may be placed in a surface area greater than one quadrant of the shell. In actual operation, the shell would be approximately 50-100 feet in diameter. The surface area of one quadrant of a 100 foot diameter sphere is approximately 7,850 square feet. Therefore, many 2 feet diameter light focusing systems may be located in one quadrant. The alternate embodiment would also comprise a plurality of heating elements. Each heating element is mounted a predetermined distance behind a light focusing system. Therefore, there would normally be the same number of heating elements as light focusing systems within the apparatus. However, it may be desirable to heat an element with a plurality of light focusing systems concentrating the incident radiation on one heating element from various angles.

It is, therefore, a general object of the present invention to provide a more efficient way of producing large quantities of potable fresh water from saltwater or contaminated fresh water.

It is a more particular object of the invention to provide a distillation unit which operates entirely off solar energy. Not only would solar energy provide a mechanism whereby saltwater is evaporated, but it would also energize the power supply used to operate all pumps and motors within the operation.

It is another object of the invention to provide an entirely automated system requiring no manual steps in achieving its general or particular objectives.

It is yet another object of the invention to provide an easily adjustable sensor which can be readily tuned to accommodate any reasonable degree of sensitivity.

Examples of the more important features of the invention have been summarized rather broadly in order that the detailed description which follows may be better understood and in order that the contribution to the art may be better appreciated. There are, of course, additional features of the invention that will be described hereinafter and which will also form the subject of the claims appended hereto.

BRIEF DESCRIPTION OF THE DRAWINGS

In order that the manner in which the recited features, advantages, and objectives of the invention as well as others, which will become apparent, are obtained and can be understood in detail, reference may be had to the embodiments which are illustrated in the appended drawings and form a part of the specification:

FIG. 1 depicts an isometric view of a shell secured to its bracket and positioned in a floating mode:

FIG. 4 is a sectional view of the light focusing system including the heating element and overflow cup:

FIG. 5 is a second sectional view of the light focusing system along its longitudinal housing, enclosing the heating element rotated due to movement of the sun:

FIG. 6 is a partial view of the heating element and gimbaled bowl:

FIG. 8 is a sectional view of a sensor taken along lines 8—8 of FIG. 7 illustrating the relationship of the window, mirrors, photoelectric cell and the adjustable plate within the enclosure housing:

FIG. 11 is an isometric view of an alternate embodiment illustrating the use of a plurality of light focusing systems:

DETAILED DESCRIPTION

Figure 2:
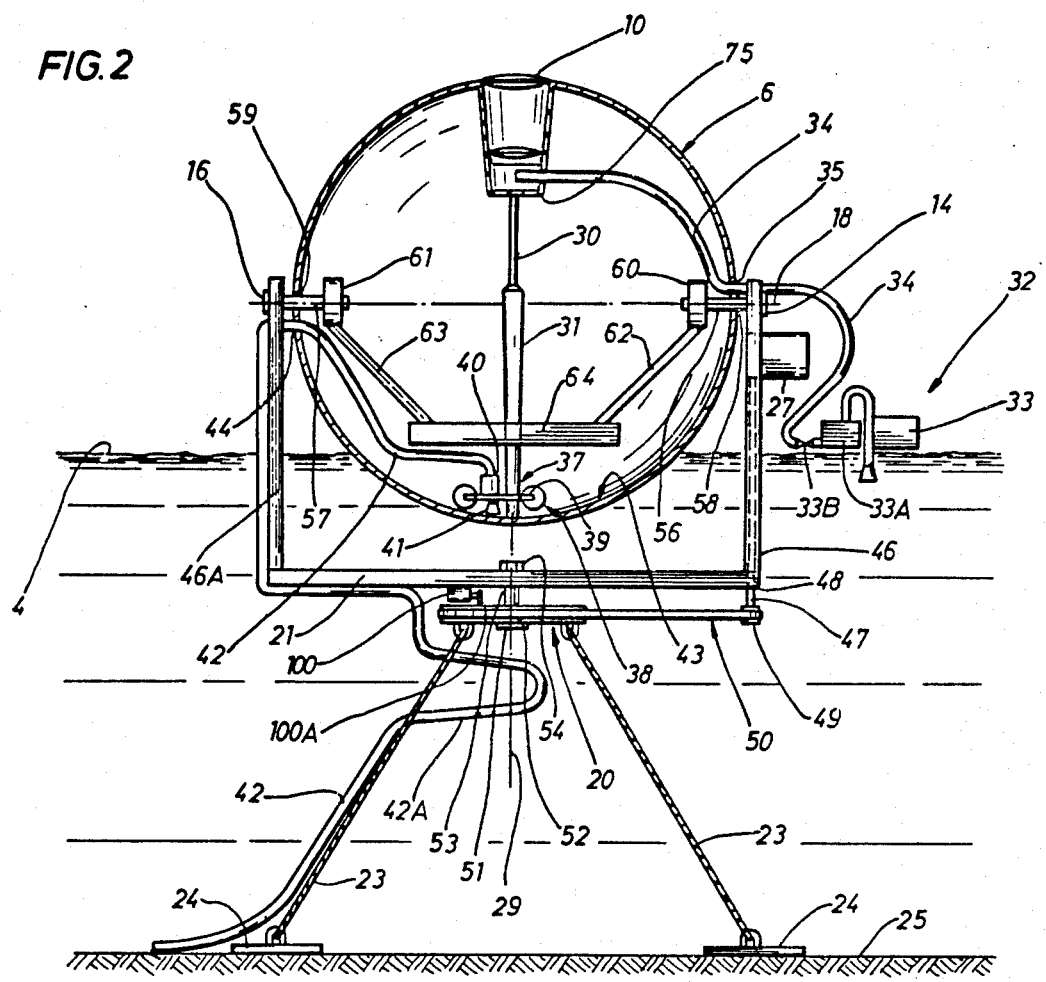
FIG. 2 shows a sectional view illustrating the relationship of the light focusing system and solid particle drain/exhaust within the shell.

Referring to FIG. 1, solar heating apparatus 2 is shown floating within saltwater body 4. The apparatus is depicted spherical in shape: however, any number of shapes are feasible. A spherical shape is particularly suitable to the ocean environment. A sphere is generally subjected to uniform distributions of loads which would be wave, wind and current forces. In addition, a spherical body exerts a uniform buoyant force thereby eliminating any eccentric buoyant forces which would otherwise develop from a nonsymmetrical body. The shell, however, may be of various shapes particularly if the apparatus is not to be floated. If secured atop a fixed offshore platform, for example, the shell may be cylindrical, rectangular, or even cubic. For ease of manufacture, it may be desirable to construct the shell in rectangular or cubic shape. In an alternate embodiment, wherein a plurality of light focusing systems are located in a particular region of the sphere's surface area, it may be desirable to flatten the surface area of that particular region. In this manner, the longitudinal axis of each light focusing system would be parallel with one another and the axis of incident radiation.

In actual size, the apparatus 2 would be 50–100 feet in diameter and constructed preferably of metal: however, other materials such as fiberglass would be suitable. The spherical housing is easily converted to a final product from discarded spherical petrochemical tanks commonly seen in refineries supported on concrete pedestals.

A U-shaped bracket 12 is attached to shell 6 at pivot points 14 and 16 (FIG. 2) along second axis 18 of shell 6. Base pulley 20 is secured to lower cross-member 21 of bracket 12. In this manner, shell 6 is gimbaled about first axis 29 and second axis 18 which are mutually perpendicular. The first axis 29 will be referred to as the vertical axis while second axis 18 will be referred to as the horizontal axis. However, it is evident that apparatus 2 may be oriented such that first axis 29 is not vertical nor second axis 18 horizontal.

Anchoring means which include eyelet 22, chain or cable 23, and anchors 24, securely fix base pulley 20 to seabed 25. Eyelets 22 are mounted directly to base pulley 20. Chain or cable 23 connects base pulley 20 to anchor 24 positioned to seabed 25. Base pulley 20 need not be secured to the seabed. It is evident, that the pulley may be securely mounted to a fixed offshore platform or connected to several platforms via cable 23.

The lower cross-member 21 of bracket 12 is free to rotate with respect to base pulley 20. As shown in FIG. 1, with base pulley 20 securely anchored to seabed 25, shell 6 and bracket 12 rotate together about vertical axis 29. Shell 6 is free to pivot about horizontal axis 18 since bracket 12 contacts shell 6 at pivot points 14 and 16.

During placement, solar heating apparatus 12 is pulled down slightly lower into the water than its neutral free floating position would allow. Base pulley 20 is then anchored by chain or cable 23 to seabed 25. Tension is maintained on chain or cable 23 at all times by the buoyant force of shell 6.

Light focusing system 10 is centrally located in quadrant 11 of shell 6. Incident radiation 8 from the sun is shown as a single straight-line path for clarity. Sensors 26A–D are located in quadrant 11 equidistantly spaced from light focusing system 10. During daylight hours, light focusing system 10 tracks the path of the sun by means of sensors 26A–D. Working in pairs the sensors 26A–D direct the sphere in multiple directions along the vertical or horizontal axes. With respect to the vertical axis, sensors 26A and 26C, as shown in FIG. 1, move the sphere to the left or right. Sensors 26B and 26D raise or lower the light focusing system about horizontal axis 18. The detailed operations of these sensors with respect to actual operating conditions will be described in greater detail below. Due to the gimbaled nature of the appartatus, it is evident that light focusing system 10 can be reorientated in three dimensions about the vertical and horizontal axes tracking the path of the sun throughout the day.

Turning to FIG. 2, there is illustrated a sectional view of shell 6 showing in greater detail light focusing system 10. Light focusing system 10 is fixed to the surface of shell 6 and projects inwardly into the interior of shell 6. Connected to the interior end of light focusing system 10 is overflow cup 75. Passage 30 is attached to the bottom of overflow cup 75 and extends to exhaust passageway 31 which extends, downward to the surface of shell 6. When apparatus 2 is in a floating [attitude] mode, passageway 31 exists below the water line. If the apparatus is equipped with a plurality of light focusing systems as disclosed in the alternate embodiment, a plurality of passages would converge onto central solid particle exhaust passageway 31 which exists shell 6 below the surface of saltwater body 4. Light focusing system 10 serves primarily as a concentration means for admitting incident rays of sunlight into the shell 6 and concentrating this sunlight on a heating element thereby elevating its temperature. If desirable overflow cup 75 can be periodically flushed with saltwater to advance the collected residue matter along passage 30 to the exterior of the sphere.

In FIGS. 4–6, light focusing system 10 is shown in greater detail. Front lens 71 is mounted within housing 72. When located in proper position, front lens 71 faces incident radiation 8. Facing 73 is attached to lens housing 72 and contacts the exterior surface of shell 6. Rear lens 74, in spaced relationship with front lens 71, is securely fixed to the rear of housing 72.

Vents 71A are located on facing 73 adjacent front lens 71. Vents 71A allow the hot air generated within lens housing 72 by the concentration of incident radiation 8 to escape into the open environment. In this manner, the interior air temperature of shell 6 is minimally affected by the high temperature inside lens housing 72. It is important that the interior of shell 6 be as cool as possible for condensation purposes as will be discussed below.

Heating element 77 is mounted on bowl 78 which is located a predetermined distance behind rear lens 74. The distance is a function of the focal length of lens 71 and 74.

Overflow cup 75 is mounted on the rear of lens housing 72 circumscribing rear lens 74. Cup 75 is open to the interior of shell 6 at aperture 75A to permit the vapors generated by the heating process to migrate toward the condensation surface. The concentrated radiation is focused at the interface between the water within bowl 78 and heating element 77. This interface is normally at the base of element 77.

As the saltwater is vaporized and the fresh water vapor migrates toward the cooler inner surface of the shell, salt and related mineral residue falls and remains on the heating element. In order to maintain an efficient operation, the heating element must be periodically cleaned. To accomodate such.

Bowl 78 is gambaled on pivoting axle 76 which terminates into the sides of overflow cup 75. Servo-motor 79 is fastened beneath bowl 78 and acts as a weight which keeps bowl 78 in a horizontal position regardless of the orientation of shell 6. Residue material remaining after the evaporation of the saltwater, collects in bowl 78. A motor 79, which may be in the form of a servomotor, is connected by shaft 81 to bowl 78. At predetermined intervals, which may be specified by an automatic timer or the like, servo-motor 79 rotates shaft 81 thereby rotating bowl 78. As shown in FIG. 6, blades 84, fixed into axle 76, are tangential with the surface of bowl 78. As servo-motor 79 rotates bowl 78, residue material is scraped off the surface of bowl 78 into overflow cup 75 by blades 84. Blades 84 are slightly bent as shown in FIG. 5 to sweep the residue material off bowl 78. In addition, the line of axis of blades 84 is perpendicular to the axis of incident radiation focusing at the base of heating element 77. In this manner, the blades 84 will not interface with the focusing radiation and absorb heat which would otherwise fall on the heating element 77.

Experimentation with a 20-inch diameter prototype, indicated a gaseous vortex which formed above the heating element 77 due to the generation of steam. Since these experiments were conducted in the northern hemisphere, the rotation of the vortex was in a clockwise direction. The vortex was one inch long with its base approximately 1/16 to ⅛ inch above the interface between heating element 77 and the saltwater within bowl 78. In actual operation, the saltwater is lifted into the vortex after ejection onto bowl 78. The prototype heating element 77 was conical in shape being ⅛ inch in diameter at the base and ⅛ inch in height. Initially, the ejected saltwater collects in bowl 78 surrounding heating element 77. As the heating element 77 reached operating temperature, the gaseous vortex formed. Near the apex of the vortex which was adjacent the interface between element 77 and the saltwater, a vacuum was created which lifted the saltwater, immediately adjacent element 77, past the heating element 77 into the vortex. As the saltwater was drawsn past the heating element 77, it was vaporized and lifted as a gas into the vortex. As the gas rose, the solid particle residue broke away approximately ¾ of an inch from the apex of the vortex and fell back onto bowl 78.

While heating element 77 was made of carbon, the apparatus operated more efficiently with a thin coating of salt on the carbon element. The salt coating behaved as part of the heating element by trapping heat within the carbon thereby inhibiting excessive temperature loss due to saturation of the element within the saltwater and by stabilizing the heat discharge. The stabilization process prevents sporadic heat discharge which otherwise disturb the uniform rate of ejection onto bowl 78 and subsequent evaporation. With respect to saltwater evaporation, there is an abundant supply of salt residue falling onto element 77 to maintain the coating.

In order to stabilized the process in contaminated fresh water, the size of heating element is increased. In this manner, the increased mass of element 77 makes it less sensitive to sporadic heat loss from oversaturation or the like. Even though this is not as efficient a technique as salt coating for stabilization of heat output, it does stabilize the heat discharge and also prevents excessive element temperatures.

During operating conditions, incident radiation 8 is focused by lens 71 and 74 onto heating element 77. The concentration of sunlight increases the temperature of heating element 77 far in excess of the boiling point of saltwater. Saltwater is ejected into bowl 78 by injection system 32 (FIG. 2), which described in detail below, at a predetermined rate. The vapor condenses on the cooler inner surface of the shell. The condensation then runs to the bottom of the shell where it is collected and removed by collection means 37 (FIG. 2). Residue material, which remains after the saltwater is evaporated, is periodically scraped off bowl 78 by blades 84. The residue material is discharged into overflow cup 75 where it is free to flow into solid particle passage 30 and solid particle exhaust passageway 31. As the saltwater evaporates, salt residue forms on element 77. Blades 84 are formed to clean and maintain the shape of element 77 with the rotation of disk 78 by servo-motor 79. As shown in FIG. 5, the edge of block 84 is sharpened to accurately scrape the element. When saltwater is being evaporated, blades 84 are adjusted to leave a thin coating of salt on the carbon element.

Referring back to FIG. 2, first motor 27 is mounted on upper vertical member 46 of bracket 12. Central shaft 47, located within bracket 12, exits bracket 12 through aperture 48. Gear 49 is mounted on the end of central shaft 47. Belt 50 engages gear 49 and base pulley 20. Base pulley 20 is attached to lower member 21 of bracket 12 by bolt 51 which passes through aperture 52 in base pulley 20 and aperture 53 in lower cross-member 21. Fastener 54 is threadedly connected to bolt 51. Lower cross-member 21 of bracket 12 is free to rotate with respect to base pulley 20. First motor 27 rotates shell 6 about vertical axis 29 defining movement within a horizontal plane and describing an azimuth 45 (FIG. 1). In response to actuation by sensors 26A and 26C, first motor 27 rotates central shaft 47. By rotating shaft 47, gear 49 is rotated thereby moving belt 50 around base pulley 20. Since base pulley 20 is securely anchored to seabed 25, bracket 12 and shell 6 are rotated about vertical axis 29 with the activation of first motor 27. In this manner, the apparatus 2 is able to pivot within a horizontal plane about vertical axis 29.

Figure 3:
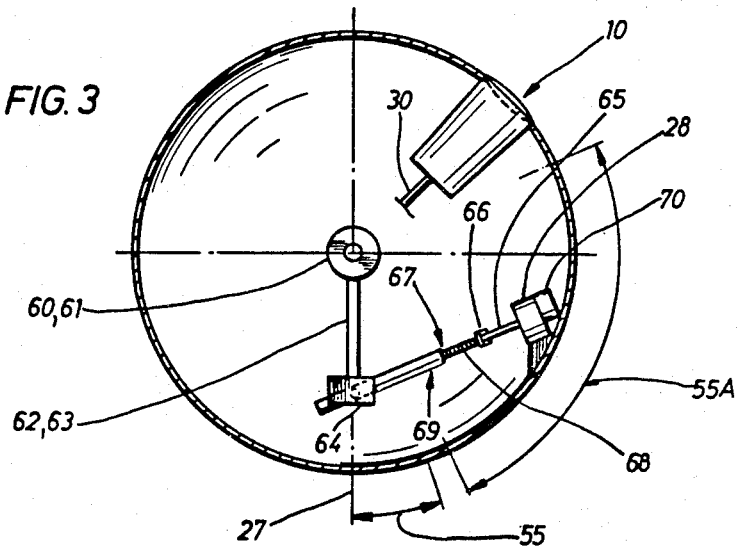
FIG. 3 is a partial sectional view illustrating the second motor and its associated drive train.

Referring now to FIGS. 2 and 3, the invention is able to pivot about horizontal axis 18. Pivot pins 56, 57 pass through upper members 46, 46A and apertures 58, 59 located on the surface of shell 6. Pins 56, 57 are aligned axially with horizontal axis 18. Sleeves 60, 61, located on pins 56, 57, respectively, are free to rotate about horizontal axis 18. Support bars 62, and 63 are fixed at one end to sleeves 60, and 61, respectively, and are mounted at their other end to central weight 64. Central weight 64 remains in a vertical position suspended by support bars 62 and 63 beneath sleeves 60, and 61 as shell 6 rotates about horizontal axis 18.

Second motor 28 (FIG. 3) is mounted on the interior surface of shell 6 and is actuated by sensors 26B and 26D.

Second motor 28 rotates drive shaft 65 which connects with universal joint 66. Rotation of drive shaft 65 operates worm gear 67. In direct response to the rotation of shaft 65, threaded shaft 68, which is connected with threaded collar 69 and comprises worm gear 67, rotates thereby displacing threaded shaft 68 with respect to threaded colar 69. Threaded collar 69 extends through weight 64: yet, it is pivotally mounted to central weight 64 to permit movement of collar 69 with respect to weight 64. All of collar 69 need not be threaded but only a preselected length preferably near the pivot point within weight 64. In this manner, the drag within collar 69 resulting from thread contact is greatly reduced.

As second motor 28 rotates drive shaft 65, worm gear 67 displaces second motor 28 along an arc describing elevation angle 55. The angle subtended by light focusing system 10 will never exceed 90° as measured from the horizontal due to the azimuth movement of the sun. In this manner, the second motor will not vary from a +45° attitude 55A as shown in FIG. 3. In other words, the horizontal movement of shell 6 about vertical axis 29 will allow the light focusing system to rise and set on the same side of central weight 64.

Power supply 70 is mounted adjacent second motor 28 and provides power for all the operational motors. Power supply 70 may comprise a rechargeable battery energized by solar cells located on the surface of shell 6 (not shown). Alternatively, power for the motor means may be supplied from outside apparatus 2 and transmitted by cable into shell 6 through apertures 35 or 44.

Figure 14:
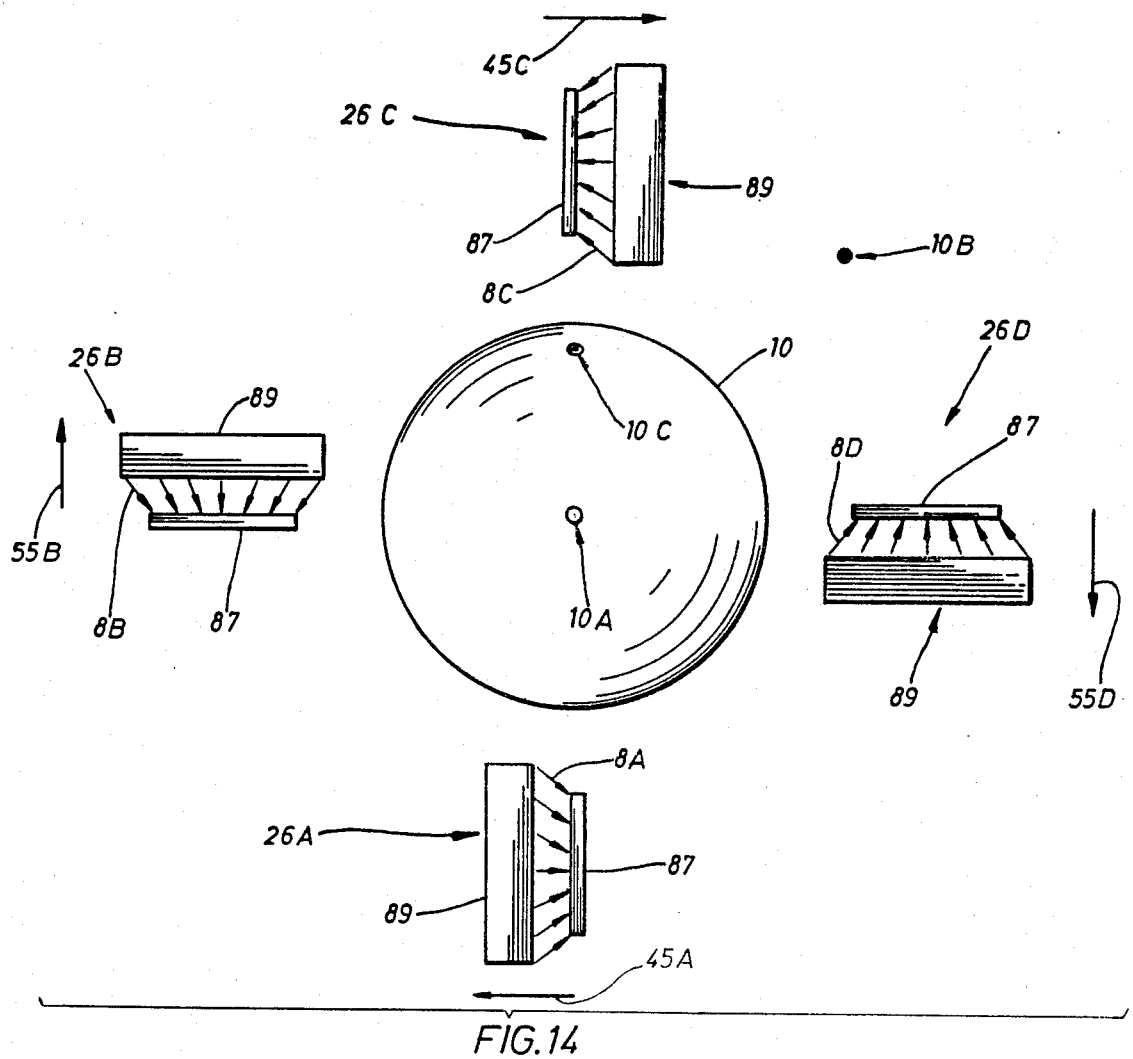
Figure 7:
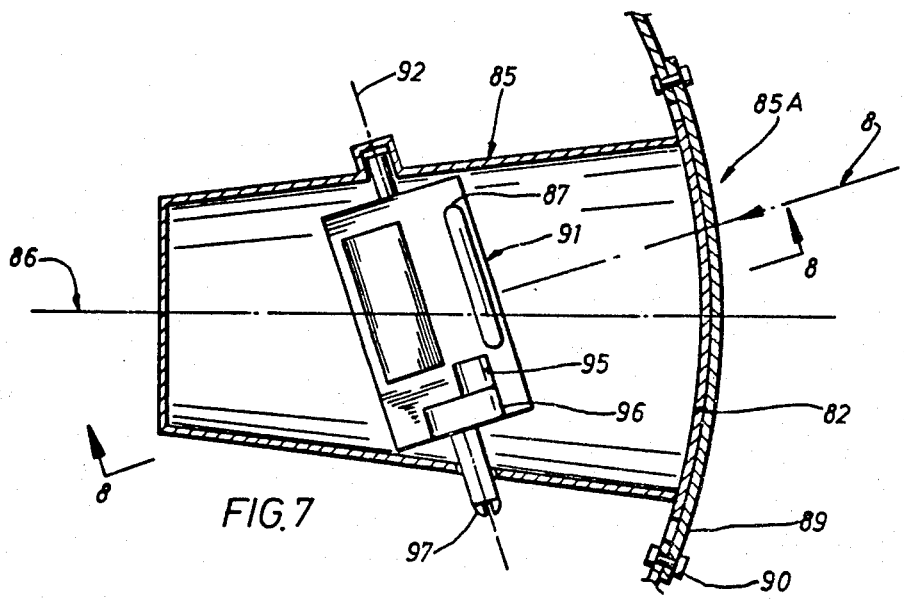
FIG. 7 is a sectional view of a sensor, illustrating the relationship between the enclosed housing and the enclosure containing mirrors, photoelectric cell, and relay.

Turning now to FIGS. 7, 8 and 14, sensors 26A-D briefly mentioned above with respect to FIG. 1, will be described in greater detail. Each sensor is similar and includes an outer housing 85 which is manufactured of an opaque material. Housing 85 is open at end 85A for admitting incident radiation 8. To protect the interior of each sensor from exposure due to open end 85A, transparent cover 82 fits over end 85A. Cover 82 will admit incident radiation into housing 85 without magnifying or altering the passing light. Cover 82 could be made similar to a watch crystal or suitable material and would perform the same function. As a unit, cover 82 and housing 85 are moisture-proof. FIG. 7 is a sectional view taken along longitudinal axis 86 of housing 85. Sensors 26A-D are not located in the exact geometric center of quadrant 11 but are equidistantly spaced from one another about the center of quadrant 11. Adjustable plate 89 is mounted on the exterior surface of shell 6 by fasteners 90. Enclosure 91 is mounted within housing 85 to pivot about axis 92. Enclosure 91 is made of an opaque material prohibiting the passage of light. Axis 92 is not perpendicular to longitudinal axis 86 but rather perpendicular with the axis of incident radiation 8. Narrow window 87 is located along the side of enclosure 91 and is the only means for light to enter enclosure 91. First mirror 93 is attached to the interior of enclosure 91 and positioned to reflect incident radiation 8 along a predetermined direction to second mirror 94 also mounted within enclosure 91. Second mirror 94 reflects radiation 8 to photoelectric cell 95. The predetermined direction results from proper alignment of first mirror 93, second mirror 94, and photoelectric cell 95. Photoelectric cell 95 is attached to relay 96 which is also mounted within enclosure 91. Screw head 97 is located along axis 92 and readily adjustable to pivot enclosure 91 about axis 92 and reorient enclosure 91. Head 97 acts as a rough tuner in initially calibrating the sensors. Adjustable plate 89 is movable with respect to cover 82 by loosening fasteners 90, relocating plate 89, and retightening fasteners 90. By rotational movement of head 97 and displacement of plate 89 the sensitivity of each sensor to light can be varied.

In an operating condition, shell 6 experiences significant movement due to wind and wave forces. The conventional sun trackers disclosed in the prior art are incapable of operating effective under such a moving condition. With the environment forces deflecting the shell in a multitude of directions, the conventional sensor will constantly "hunt" for the sun as it is rocked from sun to shade and back again. By means of head 97 and plate 89, sensors 26A-D can be desensitized to such oscillating deflections.

FIG. 8 is a sectional view taken along line 8—8 in FIG. 7. Narrow window 87 is a slot along the side of enclosure 91. The slot may be ¾ inch long and ¼ inch wide, for example. In place, slot 87 is ⅛ inch wide seen as when looking directly down on enclosure 91 from region 87A. When locking down into the sensor from region 83, however, the slot is about 1/64 inch wide. Head 97 may vary the location of regions 83 and 87A by rotating enclosure 91 about axis 92. Miror 93 is mounted in such a manner as to reflect light only when it enters from region 83. If a beam of light enters from region 87A, the light will miss mirror 93 and thereby not reflected to mirror 94 and photoelectric cell 95. Mirror 94 is located within enclosure 91 at substantially ninety degrees orientation to mirror 93. Light reflected off mirror 93 strikes mirror 94 which is reflected onto photoelectric cell 95. Relay 96 is also located within enclosure 91 adjacent photoelectric cell 95. Mirrors 93 and 94 are used not only to deflect the path of incoming light but also to modify the shape of the light. Photoelectric cell 95 is too sensitive to receive direct light entering window 87. Mirrors 93 and 94 reduce the intensity of the incoming radiation by diffusing the light over a wider surface area helping provide a more uniform distribution of light onto photoelectric cell 95. When photoelectric cell 95 is activated ita trips relay 96 (FIG. 7) which closes an electrical circuit. The details of the electrical circuits which activate first or second motors 27, 28 (FIGS. 1, 3) will be discussed below. Since photoelectric cell 95 is activated by light and moves out of the light when exposed to it, it is shadow seeking. With region 83 defined by means of head 97, plate 89 may be moved into region 83 narrowing it and thereby restricting the zone of sensitivity defined by region 83. In this manner, plate 89 has helped define a specific region of sensitivity that the sensor will only respond to.

FIG. 14 illustrates operationally how the sensors, working in pairs, will reorientate the shell. Sensors 26A and 26C control first motor 27 (FIG. 1) which rotates the shell left or right as illustrated by arrows 45A and 45C, respectively. Sensors 26B and 26D control second motor 28 (FIG. 3) which rotates the shell up or down as illustrated by arrows 55B and 55D, respectively.

Arrows 8A-8D indicate the direction incident radiation 8 (FIG. 1) must come from to lie within region 83 of that particular sensor and activate the photoelectric cell. When the sun is directly over point 10A, all four sensors 26A-D are in the shade and, therefore, inoperative. As the sun's position shifts to point 10B, incident radiation 8 (FIG. 1) falls along arrows 8C and 8B and activates sensors 26C and 26B. This will simultaneously activate the first and second motors which will move the shell up and to the right as indicated by arrows 55B and 45C. In this manner, incident radiation 8 (FIG. 1) will be repositioned to lie over point 10A heating element 77 once again. Alternatively, if the sun's position shifted to point 10C from 10A, incident radiation 8 would only activate sensor 26B due to the direction of arrows 8B. In this case, only second motor 28 (FIG. 3) would be activated which would elevate the shell as indicated by arrow 55B. Once incident radiation 8 is directly over the point 10A, the photoelectric cell of sensor 26B will once again be in the shade and therefore inoperative.

In order to compensate for the movement of the shell due to wind, wave, and inertia forces, sensitivity region 83 of each sensor is adjusted to allow a region of insensitivity between any working pair of sensors. For example, after sensor 26B has rotated the shell upward to allow point 10C to lie at the center of the light focusing system 10 as described above, the inertia of the shell created by its movement will cause the shell to slightly overshoot point 10A and continue upward before returning to a final resting position. When this occurs, it is essential that sensor 26D not be activated. Otherwise, the shell will be rotated downward as indicated by arrow 55D. This in turn would activate sensor 26B and the result would be a perpetual "hunt" for the sun. To alleviate this problem, region 83 (FIG. 8) of sensor 26B does not overlap with region 83 of sensor 26D. More specifically, region 83 of each sensor would be separated by a predetermined amount which would depend on the individual case. For weather conditions, if the apparatus were located in a region of the world which is subjected to significant lateral and vertical deflections due to the wind and wave forces, the operator would separate region 83 of each sensor such a distance as not to allow activation of the sensor except by movement of the sun, for example, over 2 degrees. The shell is restrained in a limited capacity by cable 23 (FIG. 1) and held slightly lower in the water than its neutral free-floating position creating an upward buoyant force as discussed above. This keeps cable 23 taut.

In this manner, a solar tracking system is provided which accurately monitors the path of the sun yet permits movement of shell 6 due to environmental conditions without continuously activating the sensors. The random movement resulting from environmental conditions will not be large, i.e., on the order of inches. The tracking system will accurately center light focusing system 10 in an iterative fashion once system 10 is oriented toward the sun. In other words, once sensor 26B has shifted the sun's position from 10C to 10A as discussed above, the sensor becomes inactive since the sun's rays have passed out of its sensitivity region 83. However, if a swell or wind force moves sensor 26B downward slightly, the sensor will again respond by moving system 10 upward slightly until its sensitive region 83 is out of the sun light. The next environmental force will not activate sensor 26B unless its downward deflection was larger than the first environmental deflection. Sensor 26D is not activated since its region 83 is adjusted so as to allow a neutral region between itself and region 83 of sensor 26B. Thus, system 10 is accurately oriented toward the sun based on the environmental forces acting against shell 6.

Figures 9, 10:
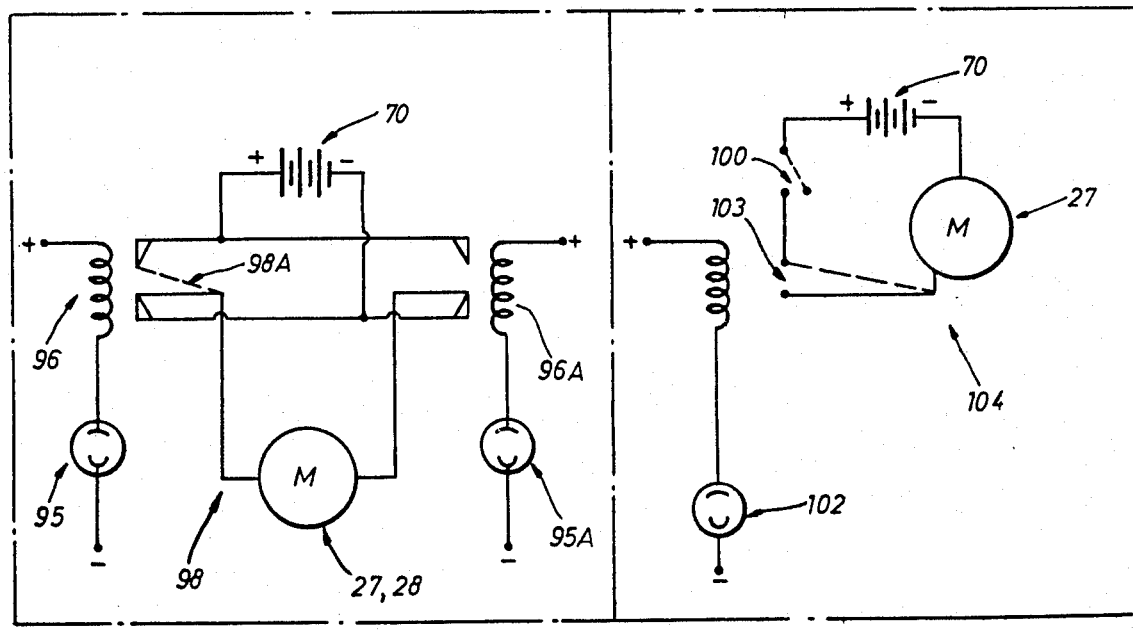
FIG. 9 is the electrical circuit utilizing the photoelectric cell, relay, power supply, and motor.
FIG. 10 is a schematic of the return system circuit which returns the light focusing system to its first position at the end of the day.

Relay response electrical circuit 98 which operates first and second motors 27, 28 as illustrated in FIG. 9. There is one circuit 98, for the movement of shell 6 about vertical axis 29; and another similar circuit 98, for movement of shell 6 about horizontal axis 18. With respect to the first circuit, which pivots shell 6 about vertical axis 29, photoelectric cells 95 and 95A are located in sensors 26A and 26C, respectively. Relay 96 is adjacent photoelectric cell 95 and relay 96A is adjacent photoelectric cell 95A. Upon sensing a specified amount of incident radiation to which the sensor has been sensitized, photoelectric cell 95 trips relay 96 which closes circuit 98, indicated by dashed line 98A, thereby allowing the power from supply 70 to flow to first motor 27. Only one photoelectric cell need be activated to trip its respective relay and close the circuit. Since first and second motors 27, 28 are direct current electric motors, their armature may effectively rotate in either direction. In other words, either motor may rotate its drive shaft clockwise or counterclockwise. Activation of sensor 26A alone will cause first motor 27 to revolve central shaft 47 clockwise as seen in FIG. 1 thereby rotating shell 6 to the left in FIG. 1. Alternatively, activation of sensor 26C will cause first motor 27 to revolve central shaft 47 counter-clockwise which in turn rotates shell 6 to the right as seen in FIG. 1. With respect to the second circuit which pivots shell 6 about horizontal axis 18, photoelectric cells 95 and 95A are located in sensors 26B and 26D, respectively. The mechanics of their operation and relationship to second motor 28 is identical to the operation and relationship of sensors 26A and 26C to first motor 27 as discussed above.

Sensors 26A and 26C control the rotation of shell 6 about first axis 29 (FIG. 1), while sensors 26B and 26D control the rotation of shell 6 about second axis 18 (FIG. 1). As the sun rises during the day, sensor 26B will control the climb of the light focusing system. If the light focusing system is elevated too high at any particular time, sensor 26B will lower it slightly in order that both sensors satisfy their respective sensitivities as adjusted by the rough and fine tuners. In the same manner, sensors 26A and 26C will control the movement of the light focusing system in a horizontal plane.

FIG. 10 depicts the electrical circuit of the return system. At the end of each day, it is necessary to return the light focusing system to its original easterly direction in preparation for the next day's sunrise. To accommodate such a condition, a return sensor system is used in conjunction with the first motor to reorientate the sphere about the first or vertical axis. Return sensor 99 (FIG. 1) is mounted in quadrant 11 (FIG. 1) of shell 6. Return sensor 99 is a conventional photoelectric cell readily available on the market. The purpose of sensor 99 is to return the light focusing system to an easterly direction after the sun has set in preparation for the next day's sunrise. Like sensors 26A–D, sensor 99 is a shadow-seeking photoelectric cell. Unlike sensors 26A–D, however, sensor 99 does not close circuit 104 until darkness is sensed by the photoelectric cell. In actual operation, sensor 99 would be adjusted for maximum light sensitivity. In this manner, sensor 99 would not close circuit 104 until the sunset. In a lighted condition, sensor 99 would keep its circuit open. When darkness falls, the photocell will trip the relay which would then close the return circuit. FIG. 10 is an electrical schematic of the return system. Activation of return sensor 99 by darkness trips relay 103 thereby closing return circuit 104 as indicated by the dotted line. Remote switch 100, mounted in series with motor 27 and power supply 70, permits the activation of motor 27 only when in a closed position. Switch 100 (FIG. 2) is located in a watertight compartment secured to lower member 21 of bracket 12. Switch 100 is normally in a closed position except when opened by striker 100A which is attached to base pulley 20. Return sensor 99 faces a westerly direction at sunset. With a decrease in light, photocell 102 trips relay 103 closing return circuit 104. First motor 27 is thereby activated and begins to rotate the shell about its vertical axis. On reapproaching its original easterly direction striker 100A opens switch 100 thereby breaking return circuit 104 and terminating the operation of motor 27. Since striker 100A has opened switch 100, the return system cannot be activated until the switch is closed and darkness is present. This will not occur again until the lens housing is facing a westerly direction at the end of the next day.

Referring back to FIG. 2, injection system 32 is disclosed for delivering saltwater to heating element 77 of light focusing system 10. Intermediate-operating pump 33 introduces saltwater into reservoir 33A. Tube 34 is connected to valve 33B and enters shell 6 through aperture 35 adjacent horizontal axis 18. A thermal sensor (not shown) senses the temperature of element 77 and controls the operation of valve 33B. The water level within reservoir 33A is maintained by a float control (not shown) which activates pump 33 whenever the water level falls below a predetermined depth.

If the operating temperature decreases, valve 33B is closed to prevent the additional saturation of element 77, otherwise the temperature of element 77 would continue to decrease terminating the heat transfer process.

Tricycle 38 is located at the lowest point of the interior surface 43 of spherical housing 6. Tricycle 38 is a free-rolling, gravity-seeking vehicle which automatically repositions itself as shell 6 is rotated about horizontal axis 18. Suction 41 and pump 40 are mounted on frame 39 of tricycle 38. Pump 40 may be activated by a float control (not shown) which starts the pump when the water level on the interior bottom surface 43 of the shell reaches a predetermined depth, for example 6"–12". As pump 40 and suction 41 recover fresh water from beneath tricycle 38, the water is removed from the interior surface 43 of shell 6 via removal tube 42. Removal tube 42 is attached to pump 40 and exits shell 6 through aperture 44 adjacent horizontal axis 18.

Tube 42 is attached to bracket 12 after it exits shell 6. Thus, the tube 42 will be displaced about vertical axis 29 as apparatus 2 and bracket 12 rotate about axis 29. Loop 42A of tube 42 provides sufficient slack to permit 180° rotation of shell 6 about axis 29 without snagging tube 42. As shown in FIG. 2, tube 42 is attached to cable 23 and continues along the ocean floor to an onshore site or floating storage system (not shown). To move the potable water within the disposing system 42A may require an auxiliary pump mounted on shell 6 or bracket 12 (not shown) if pump 40 is unable to move the liquid entirely by itself. Tube 42 connects to a storage or disposing system 42A outside shell 6. Both tubes 34 and 42 enter or exit shell 6 adjacent horizontal axis 18 since this is the most central location experiencing a minimum amount of vertical displacement, bending, and deformation during the tracking operation.

FIG. 11 is an isometric view of the alternate embodiment illustrating a plurality of light focusing systems 10 surrounding sensors 26A–D. This embodiment is similar in all respects to the preferred embodiment except for the number and size of light focusing systems and the layout of tube 34 of injection system 32 (FIG. 2). Since injection tube 34 (FIG. 2) must deliver saltwater to each heating element, the system may comprise one tube which passes adjacent each heating element for ejecting the saltwater, or the system may comprise a plurality of injection tubes which branch off primary tube 34 after tube 34 has entered shell 6. With a plurality of light focusing systems it is necessary to align the longitudinal axis of each focusing system with the direction of incident radiation 8. This will require an offset between the front lens of each focusing system and the tangential surface of the shell. This offset will increase the further away each focusing system is for the center of quadrant 11. In addition, passage 30 (FIG. 2) from each focusing system would terminate into the larger particle exhaust passageway 31.

Figure 12:
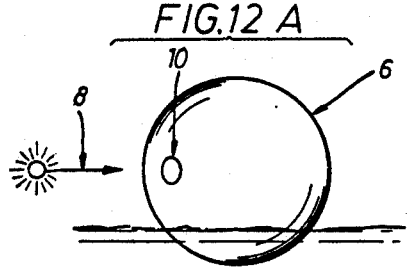
FIGS. 12A–C are elevation views illustrating the rotation of the shell about its horizontal axis.

FIGS. 12A–C illustrate the rotation of shell 6 about horizontal axis 18 (FIG. 1). Depicted is an illustration of the continuous reorientation of shell 6 during the daylight hours aligning light focusing system 10 with incident radiation 8.

Figure 13:
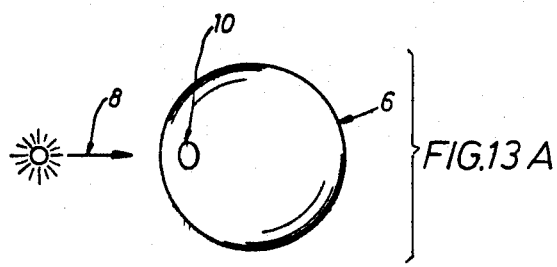
FIGS. 13A–C are plan views illustrating the rotation of the shell about its vertical axis: and, FIG. 14 is a schematic of the four sensors in operating mode around the lens focusing system as seen from outside the shell.
Figure 12:
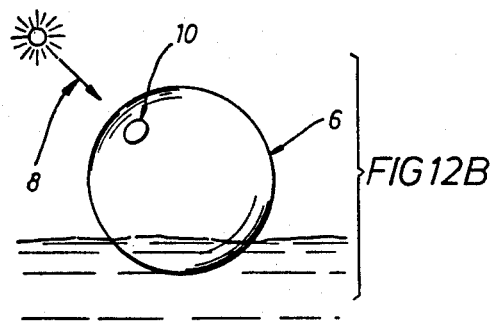
Figure 13:
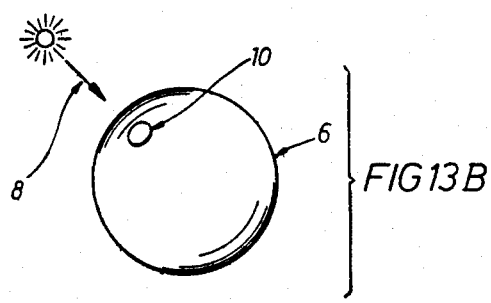
Figure 12:
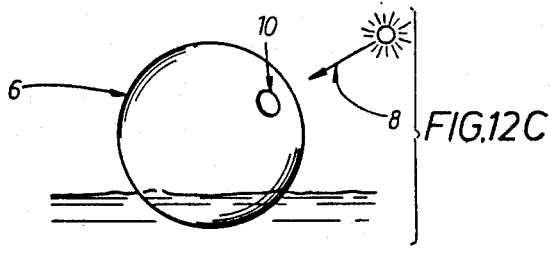
Figure 13:
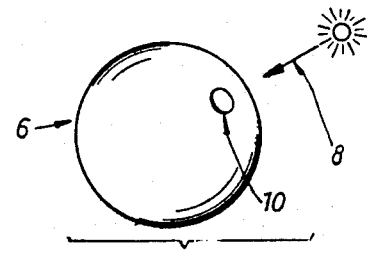

FIGS. 13A–C illustrate the rotation of shell 6 about vertical axis 29 (FIG. 1) defining an azimuth 45 (FIG. 2). The amount of azimuth will depend on the latitude when apparatus 2 is located.

In the total operation, saltwater is pumped at a predetermined rate through the injection tube onto the heating element. The rate of injection would be a function of the pump capacity, injection tube diameter and heating element temperature. The temperature of the heating element is raised prior to the ejection fo saltwater by concentrating the incident radiation via the first and second lens onto the heating element. The temperature of the heating element is estimated to be in excess of 2,000° F. Before ejecting the saltwater, the heating element should stabilize at a predetermined temperature which is estimated to be optimum around 2000° F. For this reason the gimbaled bowl is usually made of Pyrex or similar suited material. It is important that the bowl not provide a heat sink for draining the temperature of the heating element and thereby reducing its effectiveness. As the saltwater evaporates, water vapor rises and migrates toward the cooler inner surface of the shell. Upon contact with the inner surface, the vapor condenses and runs to the bottom of the shell. The fresh water is collected by means of the collection pump and collection siphon mounted on the tricycle.

In order to achieve maximum efficiency from the light focusing system and generate the most heat possible thereby vaporizing the maximum amount of saltwater, it is important that the light focusing system follows the path of the sun throughout the day. As shown in FIGS. 12A–C the shell must track the sun as it crosses the sky in a vertical plane. Not only must the apparatus properly track the sun in the vertical plane, but it must also accurately track the azimuth of the sun in a horizontal plane as shown in FIGS. 13A–C. To do this, the shell is gimbaled about the horizontal and vertical axes. To ensure that the invention follows the sun's path, a control system has been included.

The control system comprises a tracking means and motor means. The tracking means includes the sensors as described above. As the sun rises out of the east in the morning, sensor 26B receives a predetermined amount of radiation which it has been sensitized to by the rough and fine tuners. Immediately, its relay closes the circuit which activates the second motor. As the drive shaft of the second motor rotates the worm gear, the entire motor is pulled downwards raising the lens housing quadrant to follow the rising of the sun. This sensor will continue to register the rise of the sun throughout the day and then monitor its descent into the west in the afternoon. The central weight, due to the effect of gravity, remains stationary in a vertical position. The second motor, since it is mounted on the interior surface of the spherical housing, moves the entire shell through an elevation angle. In this manner, a first pair of sensors signal the first motor and control the movement of the shell in the horizontal plane while a second pair of sensors signal the second motor and control the movement of the shell in the vertical plane. Sensors 26A and C will register the azimuth movement of the sun. A predetermined amount of horizontal deviation of the sun will register on the photoelectric cells of sensors 26A or C. Proper relay response will close the circuit in which case the first motor will rotate the central shaft clockwise or counterclockwise depending on which sensor responded. With rotation of the central shaft, the bracket and shell rotate either right or left.

Alternatively, the sensor may comprise an infrared cell sensitive to longer wavelengths than the photoelectric cells thereby operation under cloudy or overcast conditions. The infrared cell would be used in lieu of the photoelectric cell within each sensor.

After the sun has set, the return sensor, activated by darkness, trips its relay, closing the return circuit activating the first motor. In this manner, the shell is reorientated to a pre-established point disclosed herein as its original easterly direction. As the light focusing system reapproaches the east, a remote underwater switch is activated by the lower member of the bracket. The return circuit is opened and the return operation is shut off. Therefore, the shell will have returned to the east ready for the next day's operation.

In an alternate embodiment, several light focusing systems may be used in lieu of the single light focusing system. The four sensors 26A-D would still be located equidistantly from one another about the center of a quadrant of the shell's surface area. The operation would be similar to that described above with respect to the preferred embodiment. Except for several focusing systems the only additional difference between the alternate and preferred embodiment is the ejection system. Instead of tube 34 terminating at the single light focusing system, it is necessary that the tube or a plurality of tubes deliver the saltwater to each heating element located behind each focusing system.

Based on experiments with the 20-inch diameter spherical prototype having a single 4-inch diameter front lens in the light focusing system, it is estimated that a 50-foot diameter sphere will generate up to 1,000 gallons of fresh water per hour. This prodiction is based on a saltwater temperature at 185° F. at input, which requires the use of a solar absorption unit. A standard solar absorption pre-heat unit may be incorporated into the injection system (not shown). Solar absorption units are readily available on the market. By elevating the temperature of the saltwater at input from normal surface temperature of approximately 80° F. to 185° F., the rate of fresh water output can be significantly increased since the saltwater is nearer its boiling point before ejection. Obviously, such an addition to the invention enhances its value.

Thus, it is apparent that there has been provided, in accordance with the invention, an economical, safe, and efficient method of producing substantial amounts of fresh water from saltwater or contaminated fresh water on an industrial scale by solar heat. Although the present invention has been defined in conjunction with specific forms thereof, it is evident that many alternatives, modifications, and variations will be apparent to those skilled in the art in light of the foregoing disclosure. Accordingly, it is intended that all such alternatives, modifications, and variations which fall within the spirit and scope of the invention as defined in the appended claims be embraced thereby.

What is claimed is:

1. A solar tracking apparatus for detecting incident solar radiation and providing a means for orienting a gimbaled body relative to said solar radiation, said tracking apparatus being insensitive to movements of said gimbaled body caused by environmental factors, comprising:
    a plurality of independent light receiving sensors capable of individual sensitivity adjustment, located on said gimbaled body;
    means operatively associated with and electrically connected to said plurality of sensors, for moving said gimbaled body about perpendicular axes relative to the position of said solar radiation; and,
    sensitizing means for controlling the amount of radiation needed to activate any of said sensors, thus inhibiting said means for moving said body in unfavorable environmental conditions;
    said sensitizing means including for each of said plurality of independent light receiving sensors, a coarse radiation adjustment means and a fine radiation adjustment means for correcting for overshoot of the solar radiation, said coarse adjustment means including a rotating drum having an aperture therein, said drum housing one of said plurality of independent light receiving sensors, said coarse adjustment means further including reflective optics for dispersion of the solar radiation to facilitate detection by said light receiving sensor.

2. A solar tracking apparatus as set forth in claim 1 wherein said means for moving said body comprises first and second motors for pivoting said body around said perpendicular axes.

3. A solar tracking apparatus as set forth in claim 1 further including means for reorientation of said body after said solar radiation has moved to a predetermined location relative to said body.

4. A solar tracking apparatus as set forth in claim 3 wherein said means for reorientation of said body comprises:
    an electrical relay which is activated upon and operatively associated with a return sensor;
    said return sensor receiving a predetermined amount of incident solar radiation, thereby moving said body to an initial position using said means for moving said body.

5. A solar tracking apparatus for detecting incident solar radiation and providing a means for orienting a body relative to said solar radiation, said tracking apparatus being insensitive to movements of said body caused by environmental factors, comprising:
    a plurality of light receiving sensors located on said body, said plurality of sensors including:
        an enclosed housing transparent at one end for admitting said solar radiation,
        an opaque enclosure having a narrow window along one side for admitting said solar radiation and mounted within said housing for pivotal movement about an axis oriented substantially perpendicular to said incident solar radiation,
        a photosensitive cell mounted within said opaque enclosure and disposed so as to be impinged by said solar radiation through said narrow window, at least one mirror mounted within said opaque enclosure for diffusing said solar radiation and deflecting said solar radiation admitted into said opaque enclosure onto said photosensitive cell;

means operatively associated with and electrically connected to said plurality of sensors, for moving said body about perpendicular axes relative to the position of said solar radiation; and, sensitizing means for controlling the amount of radiation needed to activate said sensors thus inhibiting said means for moving said body in unfavorable environmental conditions.

6. Solar tracking apparatus as set forth in claim 5 wherein said photosensitive cell comprises a photoelectric cell.

7. A solar tracking apparatus as set forth in claim 5 wherein said photosensitive cell comprises an infrared cell.

8. A solar tracking apparatus as set forth in claim 5 wherein said sensitizing means includes:

an adjustable plate mounted adjacent to said transparent end of said enclosed housing for varying the amount of radiation admitted into said enclosed housing; and, means for reorienting said narrow window with respect to said transparent end and varying the amount of incident radiation entering said opaque enclosure.

9. A solar tracking apparatus as set forth in claim 5 wherein said sensitizing means includes coarse adjustment means having means for rotating said opaque enclosure about said axis oriented substantially perpendicular to said incident solar radiation, so as to vary the amount of incident solar radiation admitted through said narrow window; and fine adjustment means having an adjustable plate mounted adjacent to said transparent end of said opaque enclosure for defining the path of said solar radiation onto said photosensitive cell.

10. A solar tracking apparatus for detecting incident solar radiation and orienting a body relative to said solar radiation, said apparatus being insensitive to random movement of said body caused by environmental factors, comprising:

a first pair of sensors for orienting said body in either direction about a first axis when said solar radiation exceeds a predetermined angle with respect to said first axis, such that rotational movement of said solar radiation about said first axis, less than the predetermined angle, does not activate either of said first pair of sensors;

a second pair of sensors for orienting said body in either direction about a second axis which is orthogonal to said first axis, when said solar radiation exceeds a predetermined angle with respect to said second axis such that rotational movement of said solar radiation about said second axis, less than the predetermined angle, does not activate either of said second pair of sensors;

wherein said sensors comprise:

an enclosed housing transparent at one end for admitting said solar radiation;

an opaque enclosure having a narrow window along one side for admitting solar radiation and mounted within said housing for pivotal movement about an axis oriented substantially perpendicular to the incident solar radiation;

a photosensitive cell mounted within said opaque enclosure and disposed so as to be impinged by said solar radiation admitted through said narrow window;

at least one mirror mounted within said opaque enclosure for diffusing said solar radiation and deflecting said solar radiation onto said photosensitive cell; and, means for adjusting the magnitude of said predetermined angles with respect to said first and second axes for varying the region of insensitivity wherein random movement of said body will not activate said first and second sensors.

11. A solar tracking apparatus as set forth in claim 10 wherein said means for adjusting comprises:

means for rotating said opaque enclosure about said axis oriented substantially perpendicular to said incident solar radiation, so as to vary the amount of incident solar radiation admitted through said narrow window; and, an adjustable plate mounted adjacent to said transparent end of said enclosed housing for defining the path of said solar radiation onto said photosensitive cell.

12. A solar tracking apparatus for detecting incident solar radiation and providing a means for orienting a gimbaled body relative to said solar radiation, said tracking apparatus being insensitive to movements of said gimbaled body caused by environmental factors, comprising:

a plurality of independent light receiving sensors capable of individual sensitivity adjustment, located on said gimbaled body;

means operatively associated with and electrically connected to said plurality of sensors, for moving said gimbaled body about perpendicular axes relative to the position of said solar radiation; and, sensitizing means for controlling the amount of radiation needed to activate said sensors thus inhibiting said means for moving said body in unfavorable environmental conditions;

said sensitizing means including a coarse radiation adjustment means and a fine radiation adjustment means for correcting for overshoot of the solar radiation;

said coarse adjustment means including a rotating drum having an aperture therein, said drum housing one of said plurality of independent light receiving sensors, said coarse adjusting means further including reflective optics for dispersion of the solar radiation to facilitate detection by said light receiving sensor.

13. A solar tracking apparatus as set forth in claim 12 wherein said fine adjustment means comprises a movable plate for fine correction of incoming solar radiation to be delivered to said light receiving sensor.

14. A solar tracking apparatus as set forth in claim 12 further including means for reorientation of said body after said solar radiation has moved to a predetermined location relative to said body.

15. A solar tracking apparatus as set forth in claim 14 wherein said means for reorientation of said body comprises:

an electrical relay which is activated on and operatively associated with a return sensor;

said return sensor receiving a predetermined amount of incident solar radiation, thereby moving said body to an initial position using said means for moving said body.

16. A solar tracking apparatus as set forth in claim 12 wherein said means for moving said body comprises first and second motors for pivoting said body around said perpendicular axes.

17. A solar tracking apparatus for detecting incident solar radiation and orienting a gimbaled body relative to said solar radiation, said apparatus being insensitive to random movement of said gimbaled body caused by environmental factors, comprising:

a first pair of sensors for orienting said body in either direction about a first axis when said solar radiation exceeds a predetermined angle with respect to said first axis, such that rotational movement of said solar radiation about said first axis, less than the predetermined angle, does not activate either of said first pair of sensors;

a second pair of sensors for orienting said body in either direction about a second axis which is orthogonal to said first axis, when said solar radiation exceeds a predetermined angle with respect to said second axis such that rotational movement of said solar radiation about said second axis, less than the predetermined angle, does not activate either of said second pair of sensors; and, means for adjusting the magnitude of said predetermined angles with respect to said first and second axes, for varying the region of sensitivity wherein random movement of said body will not activate said first and second sensors, said means for adjusting including coarse radiation adjustment means and fine radiation adjustment means for correcting overshooting the solar radiation;

said coarse radiation adjustment means including a rotating drum having an aperture therein, said drum housing one of said plurality of independent light receiving sensors, said coarse adjusting means further including reflective optics for dispersion of the solar radiation to facilitate detection by said light receiving sensor.

* * * * *